Patented July 13, 1937

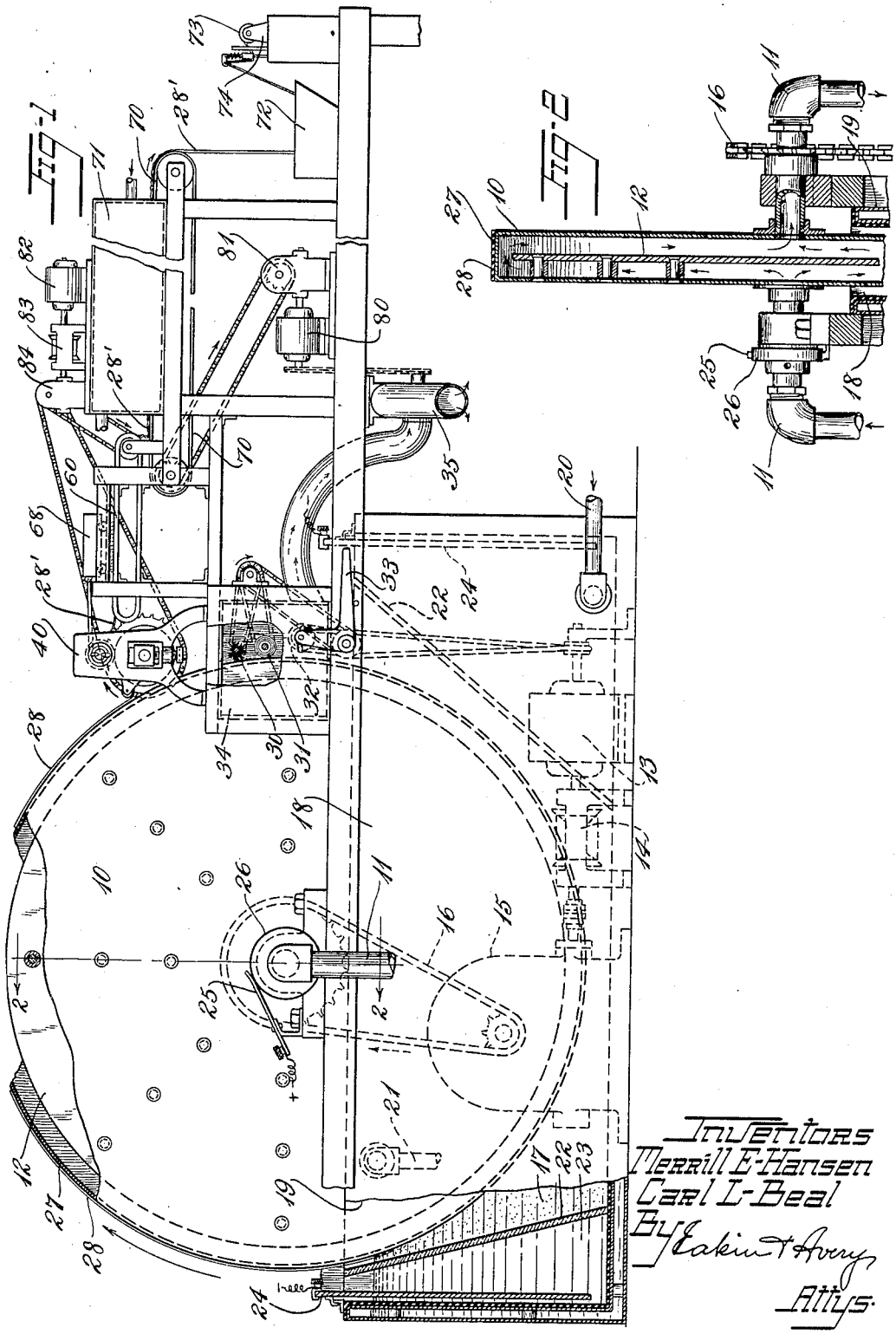

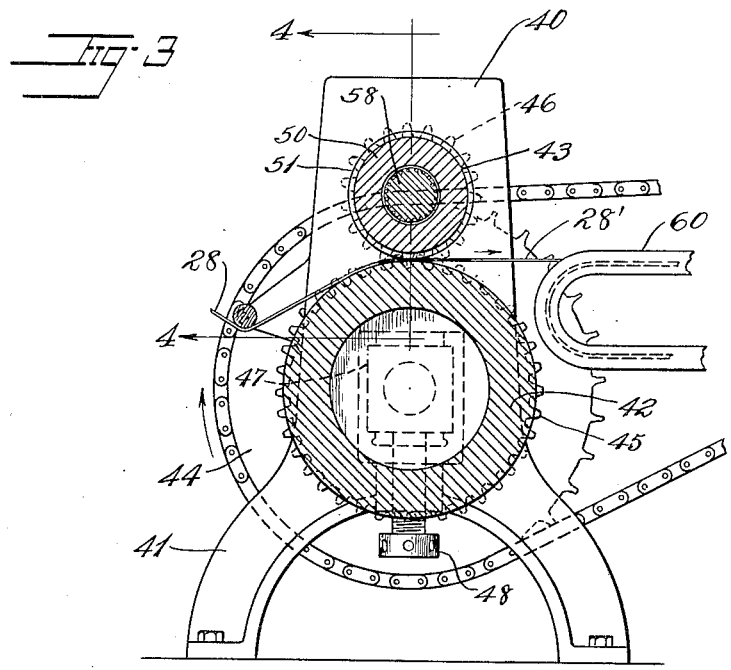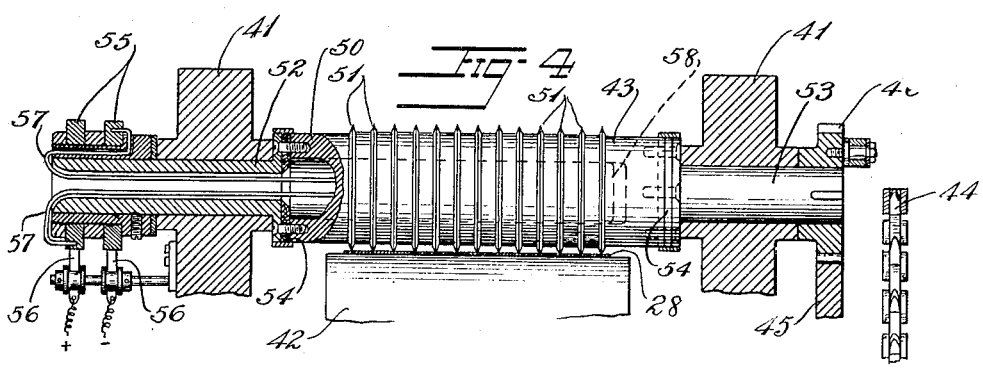

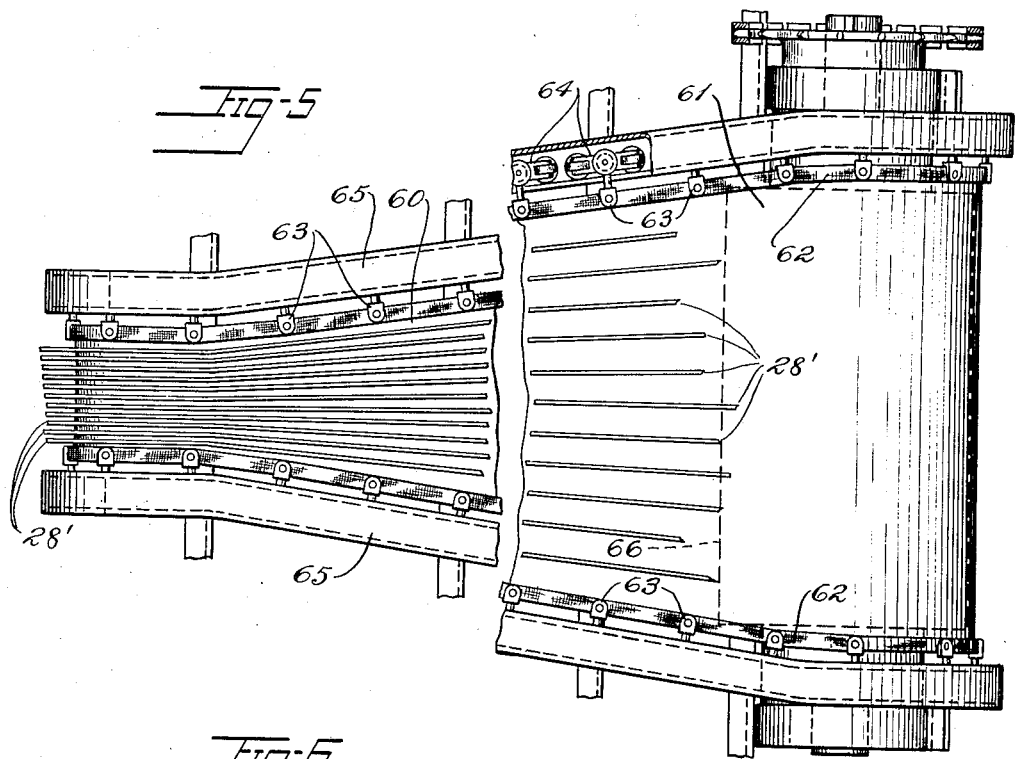
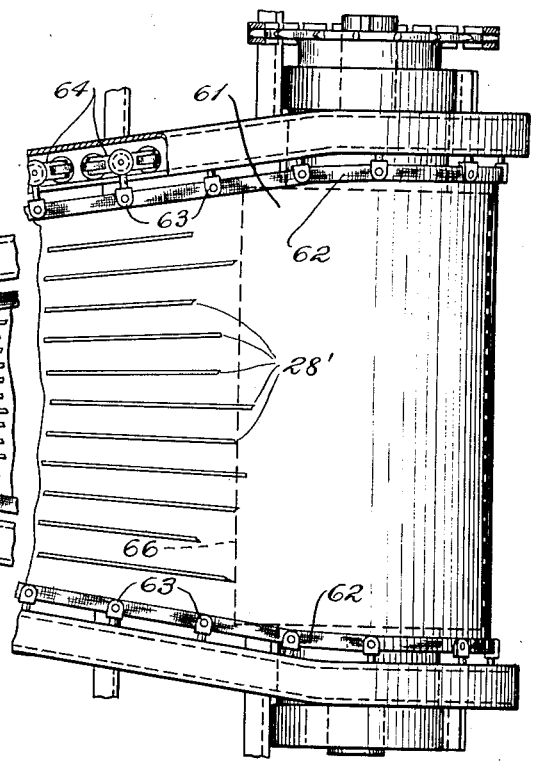
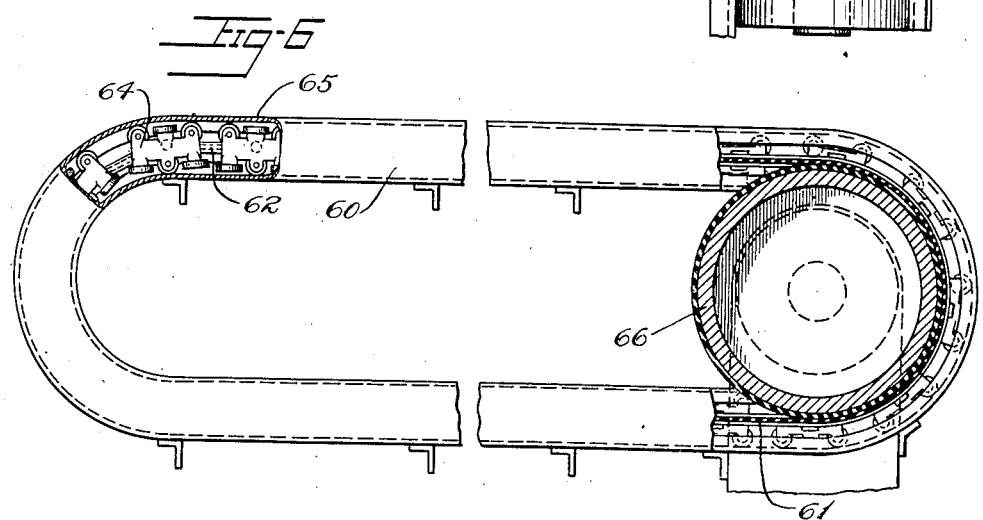
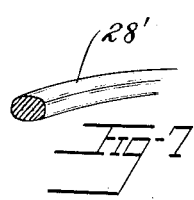

2,086,616

UNITED STATES PATENT OFFICE 2,086,616

METHOD AND APPARATUS FOR MAKING RUBBER THREAD

Merrill E. Hansen, Akron, and Carl L. Beal, Cuyahoga Falls, Ohio, assignors to American Anode Inc., Akron, Ohio, a corporation of Delaware Application April 25, 1933, Serial No. 667,796
Renewed November 5, 1935

8 Claims. (Cl. 18—15)

This invention relates to the manufacture of continuous strips of rubber such as the rubber thread used in making elastic fabrics for garments, etc. and has for its principal object the provision of a highly efficient and economical method and apparatus for making rubber thread of uniform dimensions and superior physical properties.

Broadly, the invention comprises forming from liquid latex a deposit of latex rubber, and cutting thread or similar strip rubber from the deposit while it contains a substantial amount of water, by means of a heated knife or cutter. In a preferred embodiment, the invention comprises the process of and means for continuously forming from latex a tough coherent sheet of water-containing latex rubber, slitting the freshly deposited sheet longitudinally into a plurality of strips by means of a novel cutter employing knives heated to relatively high temperatures, then separating the fresh cut lateral edges of the wet strips through the use of a unique spreading conveyor, and delivering them to a continuous dryer and vulcanizer.

The latex rubber sheet preferably is formed by depositing the solids from latex upon a moving drum or belt surface. The deposition may be effected in any of the well known manners including the use of porous filtering surfaces either with or without the aid of suction, the use of chemical coagulants applied either to the moving surface before it contacts with the latex, or to an uncoagulated layer of latex on the surface, the use of electro-phoretic means, or in some cases, simply by applying and then partially drying a film of latex upon the surface. However, it has been found that sheets formed by actually coagulating the rubber latex are more satisfactory because the coagulum is tougher and more coherent and consequently offers more resistance to distortion which aids in securing clean-cut surfaces on slitting the sheet, and also because the cut strip can be handled with less danger of damage. Electro-deposition of the solids from latex is particularly useful in the present method because it lends itself readily to continuous production methods and produces a tough coherent deposit of coagulated rubber containing often as high as 50% water, which is cut most satisfactorily by the novel cutter employed in the invention. Satisfactory deposits may be secured however by coating the moving surface with a thin film or layer of latex coagulant and then associating the coagulant-coated surface with a body of latex long enough for a deposit of the desired thickness to form upon the surface.

One of the most important features of this invention lies in cutting or slitting the freshly deposited water-containing latex rubber with knives heated to temperatures preferably well above the boiling point of water. In thread cut from freshly deposited latex rubber with a hot knife according to the present invention, the edges are cleanly cut and somewhat rounded as a result both of the deformation of the wet rubber by the knife and of the shrinkage of the cut thread during drying and vulcanization. The presence of water throughout the rubber while it is in contact with the hot knife effectively prevents any heat depolymerization or deterioration of the rubber, and produces a thread of unusual strength and wear-resisting properties.

The threads after being cut from the wet latex sheet by the hot knives still contain a high percentage of water and are somewhat tacky and in more or less contiguous relation which necessitates careful handling. Accordingly, it has been found to be desirable to provide means for separating the fresh cut edges of the strips, and for this purpose we have devised a spreading conveyor of unusual design which separates the threads without subjecting them to the action of any stresses which would deform or distort them.

These and other features of the invention will be more fully described with reference to the accompanying drawings in which:

Fig. 1 is a side elevation partially in section and somewhat diagrammatic of a preferred form of apparatus for manufacturing rubber thread.

Fig. 2 is a vertical section on line 2—2 of Fig. 1 illustrating certain constructional details of the deposition apparatus.

Fig. 3 is a vertical section through the cutting apparatus.

Fig. 4 is a vertical section along line 4—4 of Fig. 3, showing constructional details of the cutting roll which is shown incompletely sectioned.

Fig. 5 is a partially sectioned plan view of the spreading conveyor.

Fig. 6 is a partially sectioned side elevation of the spreading conveyor.

Fig. 7 is an enlarged perspective view of a section of a rubber thread made according to the method of the present invention.

The preferred apparatus comprises a hollow sheet metal deposition drum 10 suitably mounted and provided with water pipe connections 11 and a central internal baffle 12 for circulating cooling water through the interior of the drum. The drum is rotated by means of a motor 13 through an intermediate variable speed control 14, gear reduction unit 15 and sprocket chain 16. The lower portion of the drum dips into a body of latex 17 contained in a tank 18 which is provided with a water jacket 19 through which cooling water may be circulated by means of pipe connections 20 and 21.

Porous diaphragms 22 made of unglazed porcelain, asbestos, or similar material are inserted in the deposition tank near the surface of the deposition drum and serve to separate the latex from the cathode liquid 23 which may be ordinary tap water, or a solution of a neutral conductive salt such as ammonium chloride or ammonium nitrate surrounding metallic cathodes 24 which are connected to the negative terminal of a source of direct current (not shown). The positive terminal of the source of current is connected to a brush 25 which contacts with a slip ring 26 mounted on the drum shaft through which current may be conducted to the drum itself. The sides of the deposition drum are coated with an insulating paint or varnish, or with a thin layer of rubber to insulate them from the latex, and the peripherial surface 27 of the drum preferably is made of zinc, cadmium, or similar metal capable of anodic solution without the generation of gas.

When the electrical circuit is completed, current flows through the brush 25 to the body of the drum 10, through the zinc surface 27 to the body of latex 17, thence through the porous diaphragms, which are saturated with electro-conductive fluid, into the cathode liquid 23 and thence out through the cathodes 24. Under the influence of the current, the negatively charged particles of rubber and other solids suspended in the latex migrate toward and are deposited upon the peripherial surface of the rotating deposition drum to form a continuous sheet 28 of water-containing latex rubber, which is continuously stripped from the drum after it emerges from the body of the latex.

A bristle brush 30, and a buffer 31, both suitably driven and mounted so that they rotate with their outer peripheries in contact with the bare deposition surface of the drum are provided to maintain the surface in a clean condition. A driven abrasive wheel 32 mounted on a bell crank 33 may be caused to contact with the deposition surface and grind it smooth. This is necessary at intervals because the continual anodic solution of the zinc gradually impairs the integrity of the surface. The several surface-conditioning devices are enclosed in a chamber 34 to which is connected an exhaust fan 35 to remove small bits of rubber or other material which may be brushed off the drum.

The freshly deposited sheet of rubber 28 after being stripped from the deposition drum is fed directly through a cutting or slitting device 40 (more clearly shown in Figs. 3 and 4) comprising a frame 41, a backing roll 42 having a surface made of aluminum or similar soft metal, and a cutting roll 43 mounted above and with its cutting edges substantially tangent to the surface of the backing roll. Both rolls may be driven as by means of a sprocket 44 and gears 45 and 46 so that their surface speeds are equal and also substantially equal to the surface speed of the deposition drum 10, or either or both rolls may in some cases be allowed to rotate freely. The backing roll is mounted upon adjustable bearings 47 so that the peripherial relation of the two rolls may be accurately adjusted by means of adjusting screws 48.

The cutting roller itself is of novel construction and comprises a hollow cylindrical shell 50 of heat-resisting alloy steel with a plurality of machined cutting edges or knives 51 projecting from its surface. Secured to each end of the shell is a shaft 52 and 53 thermally insulated from the shell by interposed asbestos washers or packings 54. The shafts turn in bearings in the frame 41. Mounted on one of the shafts are two electrically insulated slip rings 55 which contact with brushes 56 connected to a source of current (not shown). The slip rings are connected by means of well insulated leads 57 to an electrical resistance heating element 58 contained in the center of the cutting roll.

The size or capacity of heating element required will vary according to the size cutting roll used, and according to the temperature desired. The desired temperature itself will vary widely with different thicknesses and compositions of rubber being cut, the variations ranging from 200° F. to 1000° F. These data refer to approximate temperatures measured at the cutting edges when the roll is not in contact with the wet rubber. The cutting edges will of course be considerably cooler when actually cutting because of the local cooling effect of the wet rubber in contact with the knives. A 2400 watt heating element has been found satisfactory for use in connection with a cutting roll 3 inches in diameter and 6 inches long, having nine cutting edges $\frac{3}{16}$ inch high to the inch when employed for cutting sheet 0.015 inch thick. Other means of heating the knives may be employed. For example a current may be caused to flow through the body of the cutter itself, or a current may be induced in the cutting edges to generate the necessary heat.

In many cases, it will be desirable, although not essential to successful operation, to heat the backing roll as well as the cutting roll in order to reduce the tendency to cool the cutting edges by conduction of heat from them into the backing roll. If the backing roll is to be heated to a relatively high temperature, it should preferably be of small diameter so that the rubber sheet will not be unduly affected by drying or other action of the heat by reason of too long a contact of the sheet with the hot roll.

In operation, the backing roll is adjusted so that the cutting edges of the knives are pressed a short distance into the soft aluminum surface of the backing roll where they quickly cut shallow circumferential grooves. The sheet of rubber is fed into the cutter, preferably under no tension except the slight amount required to strip the sheet from the deposition drum, and is cut cleanly into a plurality of strips 28' as it passes between the rotary knives and the backing roll.

Although heat absorbed from the hot knives effects considerable drying of the wet rubber, the cut strips still contain large percentages of water and are somewhat tacky. It is accordingly desirable to dry the threads without subjecting them to deforming forces such as might accompany attempts to coil or loop the undried thread by usual mechanical handling means. The parallel threads may be simply delivered to a horizontal conveyor and directed through a tunnel dryer and vulcanizer at a speed equal to the surface speed of the deposition drum. Assuming a deposition rate of 20 feet per minute and a required drying and vulcanizing time interval of 40 minutes, the use of such an equal speed drying conveyor would necessitate providing 800 feet of conveyor in a continuous dryer and vulcanizer. For this reason, it may be desirable to run the drying conveyor at a surface speed much slower than that of the deposition apparatus and to allow the thread as it is delivered from above to fall in loops upon the drying conveyor and so concentrate the thread and greatly reduce the length of drying apparatus required. In either case, it is desirable that the fresh cut edges of the several threads be separated and such separation of the threads preferably is effected by means of a unique spreading conveyor, hereinafter to be described.

As the freshly cut threads 28' leave the cutting apparatus, they are delivered directly upon the moving belt of the spreading conveyor 60 (more clearly shown in Figs. 5 and 6). The conveyor comprises an endless elastic belt 61 preferably made of vulcanized rubber composition reenforced along its edges by fabric 62 and supported by a series of links or clamps 63 which are secured to the fabric-reenforced edges of the elastic belt and to a series of roller assemblies 64 fitted with horizontal and vertical rolls or wheels making rolling contact with three adjacent walls of channel tracks 65 provided at both sides of the belt. The track on either side of the belt forms a complete loop corresponding to the length of the continuous conveyor belt, the two tracks being parallel throughout their length in a plane parallel to the belt surface. In a longitudinal plane vertical to the belt surface however, the two tracks diverge progressively from one end to the other in the direction of motion of the upper reach of the belt. A driven rubber covered roll 66 is provided in contact with the inner curved surface of one end of the belt for driving the belt. Instead of the sheet rubber belt, a fabric or fabric-rubber belt elastic in a lateral direction may be employed. Likewise a series of elastic fabric or rubber strips, or even of fabric or rubber-covered metal coil springs, may be used in place of the belt.

As the elastic belt progresses in a horizontal direction, the upper reach moving toward the wider end of the apparatus is progressively stretched laterally and the several threads carried by the belt are separated in a lateral direction. As the separated threads reach the end of the conveyor, they drop vertically onto a drying conveyor belt 70 located under the end of the spreading conveyor. The elastic belt of the spreading conveyor returning along its lower reach progressively regains its normal width.

A reciprocating shaker or sifter 68 is provided for the purpose of dusting soapstone upon the wet threads as they progress along the spreading conveyor.

The drying conveyor 70 preferably is run at a surface speed considerably slower than that of the spreading conveyor so that each thread will fall upon the drying conveyor in a series of loops which will form a continuous pile of thread along the conveyor. The lateral spacing of the several parallel piles will be determined by the lateral separation of the threads effected by the spreading conveyor. The threads progress on the conveyor through a tunnel dryer and vulcanizer 71 of conventional design for a time sufficient to dry and vulcanize the thread, any well known method of vulcanizing the rubber being employed. The vulcanized threads then are allowed to drop from the end of the conveyor into a box 72 from which they are continuously wound upon reels or spools 73 by means of conventional winding apparatus 74.

The drying conveyor is driven at a constant speed determined by the length of the conveyor and the drying time required, by a motor 80 and gear reduction unit 81 together with the necessary sprockets, chain, etc. The cutting apparatus and spreading conveyor are driven by a motor 82 through a variable speed control unit 83, gear reduction unit 84 and the necessary sprockets and chains, and are synchronized with the speed of the deposition drum.

Marked production economies are effected through the use of the present continuous, rapid and highly efficient process. A conservative deposition speed of about 20 feet per minute has been found to be quite satisfactory, and if a sheet wide enough to be cut into only 50 threads is made at this rate, a continuous production of 1000 feet of high grade thread per minute results. The possible width sheet and corresponding number of threads is limited only by practical difficulties in handling a large number of the finished threads simultaneously.

Latex rubber thread made according to this invention has rounded, clean-cut edges, is uniform in quality and size, and exhibits high tensile strength and excellent resistance to chafing and aging. Strips varying in size from small threads to thicker and wider bands may be made with equal facility.

Although the invention has been described in considerable detail with reference to a preferred form of apparatus, it is obvious that numerous modifications and variations may be made in the hereinabove described method without departing from the spirit of the invention. For example, a tubular deposit of water-containing latex rubber may be formed upon a cylindrical form, and a continuous thread cut from the tube while it is being rotated with the form, by means of a heated cutter mounted on a lathe-like moving support. Apparatus similar in construction is well known in the art, but the use of the hot knife for cutting wet freshly deposited latex rubber is a novel departure from prior practices which results in a decided improvement in the character of cut surfaces obtained and in the quality of the final product.

The term "latex" has been used in a generic sense to include all natural and artificial aqueous dispersions of rubber, gutta-percha, balata, and similar natural or synthetic gums, whether in the unvulcanized, vulcanized, or reclaimed condition. The latex may be thickened, thinned, concentrated, diluted, vulcanized or otherwise preliminarily treated and may contain any desirable thickening, thinning, stabilizing, or other conditioning agents. Compounding ingredients such as vulcanizing agents, accelerators, age-resisters, fillers, pigments, softeners, etc. may be admixed with the latex as desired.

We claim:

1. The continuous method which comprises forming a coherent sheet of water-containing latex rubber, slitting the sheet longitudinally into a plurality of strips, advancing the strips longitudinally and progressively separating them laterally as they are advanced.

2. Apparatus comprising means for continuously forming a coherent sheet of latex rubber, means for slitting the sheet longitudinally into a plurality of strips, means for laterally separating the strips without subjecting them to deforming forces and means for drying the separated strips.

3. Apparatus comprising means for continuously forming a sheet of unvulcanized rubber, means for slitting the sheet longitudinally into a plurality of strips, means for progressively advancing the strips longitudinally and for separating the strips laterally as they advance longitudinally, and means for vulcanizing the separated strips.

4. Apparatus comprising means for continuously forming a sheet of rubber, means for slitting the sheet longitudinally into a plurality of strips, and a laterally extensible conveyor carrying the strips in a longitudinal direction with means for progressively stretching the conveyor laterally as it advances thereby to widen the lateral distance between the strips carried by the conveyor.

5. Apparatus comprising means for forming a sheet of water-containing latex rubber, means for slitting the sheet longitudinally into a plurality of strips, said slitting means comprising a plurality of rotary knives with means for heating said knives, and a laterally stretchable conveyor carrying the strips in a longitudinal direction with means for progressively stretching the conveyor laterally as it advances, thereby to widen the distance between the strips carried by the conveyor.

6. Apparatus comprising means for continuously electro-depositing a coherent sheet of water-containing latex rubber, means for slitting the sheet longitudinally into a plurality of strips, said slitting means comprising a plurality of circular knives with means for heating said knives, and an elastic conveyor carrying the strips in a longitudinal direction with means for progressively stretching the conveyor laterally as it advances, thereby to separate the strips laterally, and means for drying said strips.

7. Apparatus comprising means for forming a sheet of water-containing latex rubber, heated means for slitting the sheet into a plurality of strips, means for advancing the strips longitudinally and for separating them laterally as they are advanced, and means for drying the strips.

8. The method which comprises continuously forming a water-containing rubber sheet from an aqueous dispersion of rubber, continuously cutting the said sheet longitudinally into a plurality of relatively narrow strips, continuously removing the said strips as cut, separating the fresh-cut lateral edges of contiguous strips from each other during removal, and heating the strips while maintaining the lateral-edge separation.

MERRILL E. HANSEN.
CARL L. BEAL.